United States Patent [19]

Liu

[11] 4,048,515
[45] Sept. 13, 1977

[54] BROADBAND LASER WITH INTRACAVITY CRYSTAL FOR GENERATING SECOND HARMONIC RADIATION

[75] Inventor: Yung S. Liu, Schenectady, N.Y.

[73] Assignee: General Electric Company, Schenectady, N.Y.

[21] Appl. No.: 696,055

[22] Filed: June 14, 1976

[51] Int. Cl.[2] .................................... H02M 5/04
[52] U.S. Cl. .............................. 307/88.3; 363/157
[58] Field of Search .................. 307/88.3; 321/69 R

[56] References Cited

U.S. PATENT DOCUMENTS

| 3,628,045 | 12/1971 | Chesler | 307/88.3 |
| 3,858,056 | 12/1974 | Melamed et al. | 307/88.3 |
| 3,993,915 | 11/1976 | Davydov et al. | 307/88.3 |

OTHER PUBLICATIONS

Wright, "Proc. IEEE," Nov. 1963, p. 1663.
Rabson et al., "Applied Physics Letters," 20 (1972) pp. 282-284.
Golyaev et al., "Sov. J. Quantum Electronics" 3 (July--Aug. 1973) pp. 72-73.
Shapiro, "Applied Physics Letters, " 13 (1968) pp. 19-21.
Kato, "IEEE J. Quantum Electronics," (Aug. 1976), pp. 616-618.

Primary Examiner—Palmer C. Demeo
Assistant Examiner—Darwin R. Hostetter
Attorney, Agent, or Firm—Marvin Snyder; Joseph T. Cohen; Jerome C. Squillaro

[57] ABSTRACT

High power, high efficiency second harmonic generation is obtained by employing a nonlinear optical crystal inside the cavity of a broadband laser. The birefringent property of the crystal and the nonlinear parametric interaction produce frequency doubling and line-narrowing simultaneously, facilitating high efficiency operation.

14 Claims; 3 Drawing Figures

BROADBAND LASER WITH INTRACAVITY CRYSTAL FOR GENERATING SECOND HARMONIC RADIATION

INTRODUCTION

This invention relates to lasers, and more particularly to a method and apparatus for efficiently achieving second harmonic generation from a high power, broadband laser by employing an intracavity nonlinear optical crystal.

Visible coherent light in the green spectrum can be generated by frequency doubling a neodymium-doped glass laser at 1.06 micrometers. This has been used to produce coherent green radiation with peak power exceeding fifty megawatts. For a neodymium-doped glass laser, efficient second harmonic generation requires the broad spectral output of the glass laser to be spectrally-narrowed within the spectral acceptance width of a nonlinear optical crystal. In Y. S. Liu application Ser. No. 668,605, filed March 19, 1976 and assigned to the instant assignee, a simple method of solving the line-narrowing problem for a glass laser is described and claimed. The present invention concerns a different approach to efficient frequency doubling of a neodymium-doped glass laser, using a nonlinear optical crystal, which involves employment of an intracavity doubling technique based on locating the nonlinear crystal inside the glass laser cavity. The invention makes simultaneous use of the birefringent property of the frequency doubling crystal and the nonlinear parametric interaction in order to obtain line-narrowing and efficient frequency doubling at the same time.

In generating second harmonic radiation, frequency conversion efficiency is proportional to power density of the fundamental beam. Hence, high conversion efficiency can be obtained with intracavity frequency doubling by placing a nonlinear crystal inside the laser cavity, since the circulating power inside the cavity usually exceeds the power level outside the cavity. Such technique has been successfully applied to many low gain or CW lasers. Further, at least for a narrow band laser oscillator with given gain and loss constants, maximum second harmonic power obtainable using intracavity doubling is equal to the maximum fundamental power available from the laser.

To obtain efficient frequency doubling from a broadband source such as a neodymium-doped glass laser by using a nonlinear, intracavity crystal, the crystal must be highly resistant to damage and have a low radiation absorption constant at the fundamental wavelength. The crystal must be relatively insensitive to beam divergence and protected against temperature variation so as not to affect the fundamental oscillation frequency. Moreover, the crystal must serve, not only as a frequency doubling element, but also, at the same time, as a line-narrowing element. A cesium dideuterium arsenate (i.e. deuterated CDA) crystal, for example, conveniently meets these requirements.

Accordingly, one object of the invention is to obtain higher efficiency second harmonic generation from neodymium-doped glass lasers than is possible with external cavity frequency doubling.

Another object is to obtain high efficiency second harmonic generation from glass lasers without requiring additional elements to achieve line-narrowing.

Another object is to obtain high power second harmonic generation from a single, 1.06 micrometer laser oscillator.

Briefly, in accordance with a preferred embodiment of the invention, a high-power, second harmonic frequency generating laser comprises a neodymium-doped glass radiation-emitting structure disposed within a cavity optically-resonant at the fundamental frequency of the laser, the cavity being defined by first and second reflecting means at its extreme ends. The first reflecting means is oriented normally to the optic axis of the emitting structure. A nonlinear doubling crystal is also disposed within the cavity, oriented such that its phase-matching direction is normal to the second reflecting means. (As pointed out by J. A. Giordmaine, "Mixing of Light Beams in Crystals," *Physical Review Letters*, 8, 19 (1962), the phase-matching direction of the crystal is the direction therein in which the fundamental and second harmonic waves are in phase). The relative angular relationship of the first and second reflecting means is selected such that the optic axis of the emitting structure and the phase-matching direction of the doubling crystal intersect at a point within the cavity. A Q-switching crystal is positioned in the cavity in optical alignment with the radiation-emitting structure and is adapted to control initiation of oscillation in the cavity. Optical means reflective to radiation at the fundamental frequency and transparent to radiation at the second harmonic frequency, and situated at the intersection of the emitting structure optic axis and the doubling crystal phase-matching direction, deflects radiation at the fundamental frequency toward either of the first and second reflecting means and transmits out of the cavity radiation at the second harmonic frequency received directly from the doubling crystal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
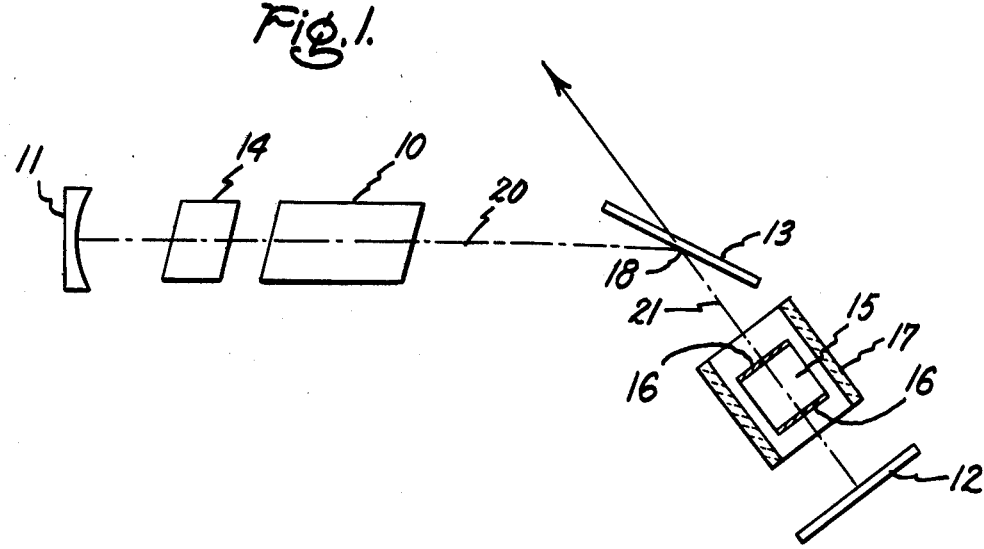
FIG. 1 is a schematic illustration of one embodiment of a neodymium-doped glass laser employing an intracavity nonlinear optical crystal for generating second harmonic radiation.

In FIG. 1, a laser constructed in accordance with the instant invention is illustrated schematically. A pair of reflecting means such as mirrors 11 and 12 define opposite extreme ends of a cavity optically resonant at 1.06 micrometers. A radiation-emitting structure 10 may conveniently comprise neodymium-doped glass in a configuration such as the "zigzag" configuration described in J. P. Chernoch U.S. Pat. No. 3,679,999 issued July 25, 1972 and assigned to the instant assignee, in which the optical energy therein passes along a zigzag path and which, viewed from the side, assumes the shape of a parallelogram. The reflecting surface of mirror 11 is perpendicular to the longitudinal axis of emitting structure 10 which coincides with the optic axis thereof. The active medium of emitting structure 10 may comprise, for example, 2%-3% neodymium-doped glass, available from Owens-Illinois, Inc., Toledo, Ohio, under the nomenclature ED-2. The pumping wavelength is preferably in the range of 500 to 900 nanometers, and structure 10 emits coherent radiation at 1.06 micrometers wavelength.

A Q-switching crystal 14, which may be comprised of potassium dideuterium phosphate (also known as KD*P) and is of parallelepiped configuration, is situated between emitting structure 10 and mirror 11. This cell exhibits the Pockels effect; that is, when no electric field is applied across the cell, optical energy passes through the cell without any modification in direction or polarization. However, when an electric field is impressed across the cell, the polarization plane of a polarized light beam impinging upon the cell is rotated about the direction of the beam. Hence if a voltage is applied across crystal 14 so as to rotate the polarization plane of optical energy impinging thereon from structure 10, light reflected from mirror 11 is polarized by crystal 14 in still another plane. Thus if the voltage across crystal 14 is such as to rotate by 90° the polarization plane of light passing therethrough in either direction, the beam reflected from mirror 11 suffers increased loss, causing oscillation to terminate. On the other hand, if no voltage is applied across cell 14, the optical energy undergoes essentially no modification when passing therethrough in either direction. Laser oscillation therefore can take place because sufficient power can be stored inside the cavity to allow laser emission to occur.

A doubling crystal 15 is situated in the laser cavity at the end near mirror 12. Doubling crystal 15 is preferably comprised of cesium dideuterium arsenate, though other nonlinear crysals such as cesium dihydrogen arsenate (i.e. CDA), $Ba_2NaNb_5O_{15}$, $LiNbO_3$, $LiIO_3$, potassium dihydrogen phosphate (i.e. KDP), and potassium dideuterium phosphate (i.e. deuterated KDP) may, alternatively, be employed. Cesium dideuterium arsenate is normally used as a 90° phase-matched crystal; that is, the fundamental wave propagates through the crystal as an ordinary wave and its propagating direction is normal to the optical axis of the crystal. In order to introduce the birefringent effect, the crystal is slightly tilted a few degrees at an angle with respect to the direction which is otherwise employed in the 90° phase-matching second harmonic generation. This slight angular misalignment is believed essential for those crystals requiring 90° phase-matching, which includes $Ba_2NaNb_5O_{15}$ and $LiNbO_3$. Frequency stability of crystal 15 is assured by maintaining the crystal in a constant temperature oven 17. To maximize efficiency of the apparatus, the crystal faces, which are parallel to the reflecting surface of mirror 12 and perpendicular to the phase-matching direction 21 of the crystal, are coated with an antireflection coating 16. A dielectric polarizer 13 is situated within the cavity to deflect the path of light of 1.06 micrometers wavelength between mirrors 11 and 12 and to pass light at 0.53 micrometers wavelength without substantially attenuating this light. Optical means 13 is positioned at the point of intersection 18 of the optic axis 20 of emitting structure 10 and the phase-matching direction of doubling crystal 15.

In operation, when Q-switching crystal 14 permits emitted radiation from active element 10 to reach mirror 11, coherent light of 1.06 micrometers wavelength strikes dielectric polarizer 13 and, since the dielectric polarizer is highly reflective to light of that wavelength, the light is deflected through doubling crystal 15 to mirror 12. Due to the nonlinear nature of crystal 15, a strong second harmonic wavelength of 0.53 micrometers is developed therein. Both the 1.06 and 0.53 micrometer wavelengths are reflected by mirror 12. However, dielectric polarizer 13 is essentially transparent to wavelengths of 0.53 micrometers, so that second harmonic wavelengths from crystal 15 are emitted from the laser cavity through dielectric polarizer 13 and do not reach mirror 11. Hence the glass laser apparatus of FIG. 1 produces second harmonic output radiation at a wavelength of 0.53 micrometers, while preventing output radiation at the fundamental wavelength.

Deuterated CDA has been employed in obtaining second harmonic generation from neodymium-doped yttuim-aluminum-garnet (YAG) lasers, as described, for example, by K. Kato, "Second-Harmonic Generation in CDA and CD*A," *IEEE Journal of Quantum Electronics*, 616 (Aug. 1974). However, in a YAG laser, due to the narrow output spectrum of the YAG active medium in comparison to that of a neodymium-doped glass active medium, line-narrowing is not required for efficient frequency doubling.

In T. A. Rabson et al., "Efficient Second Harmonic Generation of Picosecond Laser Pulses", *Applied Physics Letters*, 20, 282 (1972), a dye cell is employed in an intracavity second harmonic generator to mode-lock and Q-switch a 1.06 micrometer neodymium-doped glass laser pump source to produce picosecond light pulses at 0.53 micrometers. Mode-locking, however, results in generation of a train of extremely short-duration pulses. These pulses have a spectrum function that is more than 10 times wider than that which can be efficiently phase-matched for crystals such as deuterated CDA. Therefore, efficient second harmonic generation cannot be achieved without an appropriate mechanism for achieving line-narrowing.

The present invention overcomes the aforementioned disadvantageous characteristics of broadband lasers, such as neodymium-doped glass lasers, by employing a nonlinear optical crystal inside the broadband laser cavity. Line-narrowing and frequency doubling are thus achieved simutaneously, resulting in a high conversion efficiency.

Figure 2:
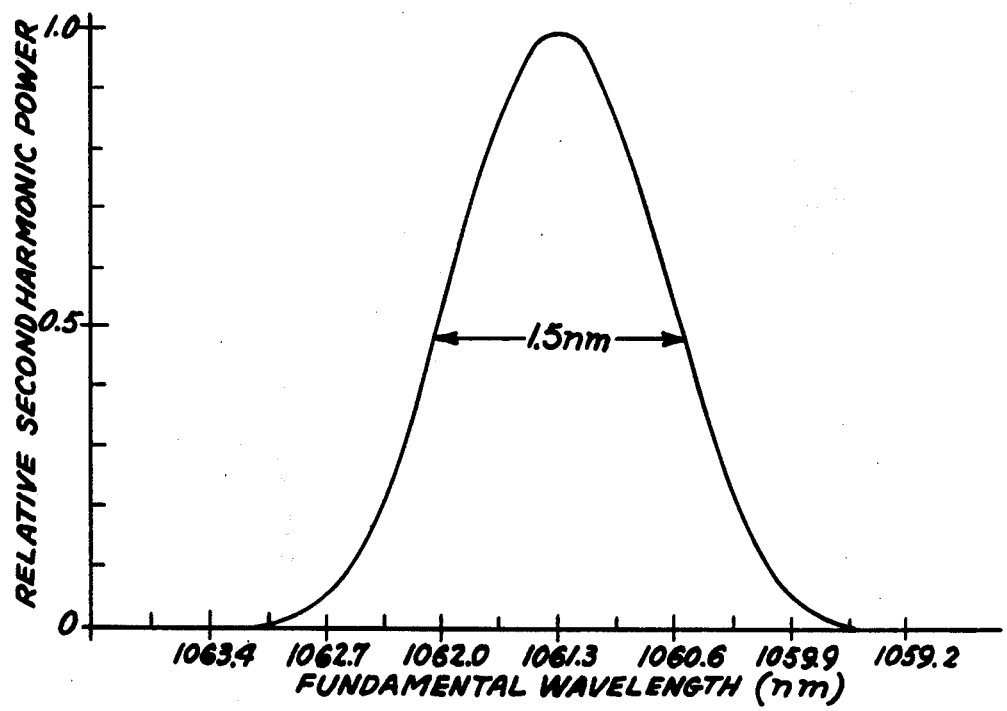
FIG. 2 is a graphical illustration of the phase-matching condition for the nonlinear optical crystal employed in the apparatus shown in FIG. 1.

FIG. 2 is an illustration of the relationship between second harmonic power and fundamental wavelength produced by a laser employing a deuterated CDA doubling crystal. The spectral acceptance width of 1.5 nanometers is measured at the second harmonic half-power level. Although this curve is centered at a wavelength of 1061.3 nanometers (i.e. 1.0613 micrometers), it will be appreciated that slight shifting of the entire curve toward higher or lower wavelength may be achieved simply be altering the doubling crystal temperature.

Figure 3:
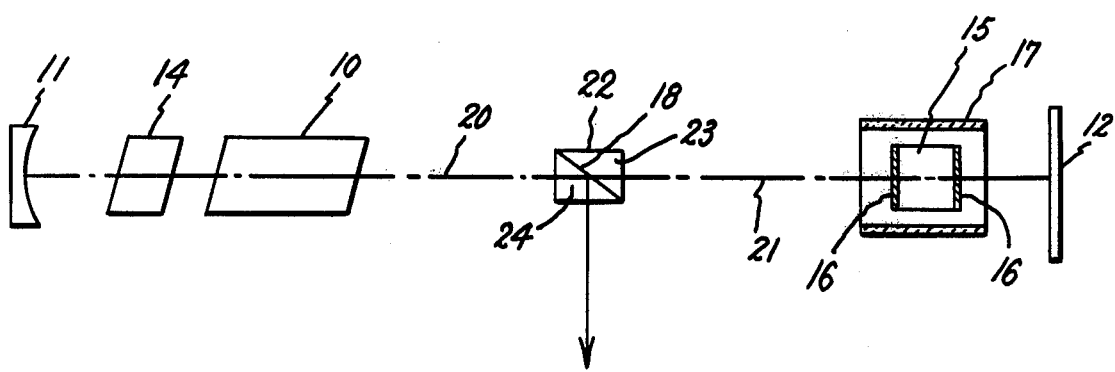
FIG. 3 is a schematic illustration of another embodiment of a neodymium-doped glass laser employing an intracavity nonlinear optical crystal for generating second harmonic radiation.

FIG. 3 illustrates apparatus constructed in accordance with a second embodiment of the invention. In this embodiment, like reference numerals correspond to like components in the apparatus shown in FIG. 1. However, the apparatus of FIG. 3 employs a Glan prism 22 instead of dielectric polarizer 13 in order to deflect the path of light of 1.06 micrometers wavelength between mirrors 11 and 12 and to pass light at 0.53 micrometers wavelength without substantially attenuating this light. The prism is positioned such that the separation between parts 23 and 24 is situated at point 18 on the coinciding optic axis 20 of emitting structure 10 and the phase-matching direction of doubling crystal 15.

Operation of the apparatus of FIG. 3 is essentially the same as that of the apparatus of FIG. 1. That is, coherent light of 1.06 micrometers wavelength from active element 10 striking Glan prism 22 passes straight through the prism and through doubling crystal 15 to mirror 12. Of the 1.06 and 0.53 micrometer wavelengths reflected back by mirror 12, the 0.53 micrometer wavelength is deflected out of the laser cavity by Glan prism 22 so that second harmonic wavelengths from crystal 15 are emitted from the laser cavity through Glan prism 22 and do not reach mirror 11. Hence the glass laser apparatus of FIG. 3, like that of FIG. 1, produces second harmonic output radiation at a wavelength of 0.53 micrometers, while preventing output radiation at the fundamental wavelength.

The foregoing describes a neodymium-doped glass laser which provides second harmonic generation with higher efficiency than possible with external cavity frequency doubling. Line-narrowing is inherently accomplished without need for additional elements, and only a single laser oscillator is employed.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A high-power, second harmonic frequency generating laser comprising:

a neodymium-doped glass radiation-emitting structure disposed within a cavity optically-resonant at the fundamental frequency of said laser, said cavity including first and second reflecting means defining the extreme ends of said cavity, said first reflecting means being oriented normally to the optic axis of said emitting structure;

a nonlinear doubling crystal disposed within said cavity and oriented such that its phase-matching direction is slightly misaligned from the normal to said second reflecting means, the angular relationship of said first and second reflecting means being selected such that the optic axis of said emitting structure and the phase-matching direction of said doubling crystal intersect at a point within said cavity;

a Q-switching crystal in said cavity optically aligned with said radiation-emitting structure and adapted to control initiation of oscillation in said cavity; and optical means substantially reflective to radiation at said fundamental frequency and substantially transparent to radiation at said second harmonic frequency, said optical means being situated at the intersection of the emitting structure optic axis and the doubling crystal phase-matching direction so as to deflect radiation at said fundamental frequency toward either of said first and second reflecting means and to transmit out of said cavity radiation at said second harmonic frequency received directly from said doubling crystal.

2. The apparatus of claim 1 wherein said nonlinear doubling crystal comprises deuterated CDA.

3. The apparatus of claim 1 including temperature stabilizing means surrounding at least a portion of said doubling crystal.

4. The apparatus of claim 2 including temperature stabilizing means surrounding at least a portion of said doubling crystal.

5. The apparatus of claim 1 wherein said optical means reflective to radiation at said fundamental frequency and transparent to radiation at second harmonic frequency comprises a dielectric polarizer.

6. The apparatus of claim 1 wherein said optical means reflective to radiation at said fundamental frequency and transparent to radiation at said second harmonic frequency comprises a Glan prism.

7. The apparatus of claim 2 wherein said optical means reflective to radiation at said fundamental frequency and transparent to radiation at said second harmonic frequency comprises a dielectric polarizer.

8. The apparatus of claim 2 wherein said optical means reflective to radiation at said fundamental frequency and transparent to radiation at said second harmonic frequency comprises a Glan prism.

9. The apparatus of claim 1 wherein said nonlinear doubling crystal comprises CDA.

10. The apparatus of claim 9 wherein said optical means reflective to radiation at said fundamental frequency and transparent to radiation at second harmonic frequency comprises a dielectric polarizer.

11. The apparatus of claim 9 wherein said optical means reflective to radiation at said fundamental frequency and transparent to radiation at said second harmonic frequency comprises a Glan prism.

12. The apparatus of claim 1 wherein said nonlinear doubling crystal comprises one of the group consisting of $Ba_2NaNb_5O_{15}$, $LiNbO_3$, $LiIO_3$, KDP and deuterated KDP.

13. The apparatus of claim 12 wherein said optical means reflective to radiation at said fundamental frequency and transparent to radiation at second harmonic frequency comprises a dielectric polarizer.

14. The apparatus of claim 12 wherein said optical means reflective to radiation at said fundamental frequency and transparent to radiation at said second harmonic frequency comprises a Glan prism.

* * * * *